US010030702B2

(12) United States Patent
Baucé et al.

(10) Patent No.: US 10,030,702 B2
(45) Date of Patent: Jul. 24, 2018

(54) MAGNETIC BEARING, ROTARY APPARATUS COMPRISING SUCH A MAGNETIC BEARING AND METHOD FOR MANUFACTURING SUCH A MAGNETIC BEARING

(71) Applicants: Yvon Baucé, Les Higues (FR); Francis Bienaime, Mont Saint-Aignan (FR); Eduardo Carrasco, Saint Etienne sous Bailleul (FR)

(72) Inventors: Yvon Baucé, Les Higues (FR); Francis Bienaime, Mont Saint-Aignan (FR); Eduardo Carrasco, Saint Etienne sous Bailleul (FR)

(73) Assignee: SKF MAGNETIC MECHATRONICS, Rue des Champs, Saint-Marcel (FR)

( * ) Notice: Subject to any disclaimer, the term of this patent is extended or adjusted under 35 U.S.C. 154(b) by 330 days.

(21) Appl. No.: 14/945,599

(22) Filed: Nov. 19, 2015

(65) Prior Publication Data
US 2016/0178005 A1 Jun. 23, 2016

(30) Foreign Application Priority Data
Nov. 27, 2014 (EP) .................................... 14306912

(51) Int. Cl.
*F16C 32/04* (2006.01)
*F16C 43/00* (2006.01)
(Continued)

(52) U.S. Cl.
CPC .......... *F16C 32/048* (2013.01); *F16C 32/047* (2013.01); *F16C 32/0446* (2013.01);
(Continued)

(58) Field of Classification Search
CPC ................ F16C 32/048; F16C 32/0446; F16C 32/0461; F16C 32/047
(Continued)

(56) References Cited

U.S. PATENT DOCUMENTS 5,310,311 A      5/1994    Andres et al.
5,319,273 A *   6/1994    Hockney ............... F04D 29/058
                                                                       310/90.5
(Continued)

FOREIGN PATENT DOCUMENTS

CN         101482144 A     7/2009
DE           3910769 A1    10/1990
(Continued)

*Primary Examiner* — Jeremy Luks
(74) *Attorney, Agent, or Firm* — Bryan Peckjian; SKF USA Inc. Patent Dept.

(57) ABSTRACT

A magnetic bearing, adapted to equip a rotary apparatus. The magnetic bearing comprises: an actuator sub-assembly provided with a magnetic base and at least three actuator bobbins mounted on the magnetic base, and a sensor sub-assembly provided with at least three magnetic sensors associated with the actuator bobbins. At least one sub-assembly amidst the actuator sub-assembly and the sensor sub-assembly comprises at least three sectors mounted together. Each sector includes at least one actuator bobbin when the sector belongs to the actuator sub-assembly, or at least one magnetic sensor when the sector belongs to the sensor sub-assembly. The invention also concerns a rotary apparatus comprising such a magnetic bearing and a method for manufacturing such a magnetic bearing.

15 Claims, 6 Drawing Sheets

(51) Int. Cl.
   *H01F 5/02* (2006.01)
   *H02K 15/00* (2006.01)
   *H01F 7/06* (2006.01)
(52) U.S. Cl.
   CPC .......... *F16C 32/0461* (2013.01); *F16C 43/00* (2013.01); *H01F 5/02* (2013.01); *H01F 7/06* (2013.01); *H02K 15/00* (2013.01); *F16C 2360/45* (2013.01)
(58) Field of Classification Search
   USPC ........................................................ 310/90.5
   See application file for complete search history.

(56) References Cited

U.S. PATENT DOCUMENTS

| | | | |
|---|---|---|---|
| 5,924,186 A | 7/1999 | Nakagawa et al. | |
| 6,608,418 B2* | 8/2003 | Andres | F01D 15/10 310/90.5 |
| 6,849,979 B2* | 2/2005 | Brunet | F16C 32/0446 310/68 B |
| 2004/0164632 A1 | 8/2004 | Brunet et al. | |
| 2008/0073993 A1* | 3/2008 | Sortore | F16C 32/0459 310/90.5 |
| 2008/0231128 A1 | 9/2008 | Buhler et al. | |
| 2009/0265038 A1* | 10/2009 | Ramsey | F16C 32/0442 700/279 |
| 2015/0233422 A1* | 8/2015 | Irino | F16C 32/0461 310/90.5 |

FOREIGN PATENT DOCUMENTS

| | | |
|---|---|---|
| EP | 3647 A1 | 8/1979 |
| EP | 1162714 A2 | 12/2001 |
| GB | 1302093 A | 1/1973 |
| JP | S59122426 U | 8/1984 |
| WO | 08039256 A2 | 6/2007 |

* cited by examiner

MAGNETIC BEARING, ROTARY APPARATUS COMPRISING SUCH A MAGNETIC BEARING AND METHOD FOR MANUFACTURING SUCH A MAGNETIC BEARING

CROSS REFERENCE TO RELATED APPLICATIONS

This is a Non-Provisional Patent Application, filed under the Paris Convention, claiming the benefit of Europe (EP) Patent Application Number 14306912.8, filed on 27 Nov. 2014, which is incorporated herein by reference in its entirety.

TECHNICAL FIELD OF THE INVENTION

The invention concerns a magnetic bearing. The invention also concerns a rotary apparatus comprising such a magnetic bearing. The invention also concerns a method for manufacturing such a magnetic bearing.

BACKGROUND OF THE INVENTION

In a known manner, magnetic bearings can be integrated to rotating apparatuses, such as flywheels, turbo molecular pumps, turbo expanders, turbo compressors, air blowers, spindles, chillers, etc. For instance, flywheels are designed to store rotational energy. Flywheels equipped with conventional bearings are limited to a revolution rate of a few thousand RPM (revolutions per minute), while flywheels equipped with magnetic bearings can reach up to hundred thousand RPM.

WO-A-2008/039256 discloses an example of magnetic bearing, comprising actuators and sensors belonging to a same central sub-assembly. The magnetic bearing also comprises two support plates arranged on either side of the central sub-assembly. The actuators, formed by electromagnets, are designed to support and position a rotating device, such as a rotating shaft. The sensors are designed to control the operation of the actuators. The magnetic bearing also includes electrical wires for transmitting energy or signals.

Today, assembly of the different constitutive parts of the magnetic bearing is done manually. Generally, the magnetic actuators and sensors include magnetic coils which are made of copper wire and are wound up around coil holders. Methods for manufacturing such magnetic bearings include manual operations. Magnetic coils are wound up manually around the coil holders. Moreover, electrical connections between the magnetic coils are done manually. Thus, labor time and cost to manufacture magnetic bearings with those methods are not fully satisfactory, in particular for high production volumes.

SUMMARY OF THE INVENTION

The aim of the invention is to provide an improved magnetic bearing.

To this end, the invention concerns a magnetic bearing, adapted to equip a rotary apparatus. According to the invention, the magnetic bearing comprises: an actuator sub-assembly provided with a magnetic base and at least three actuator bobbins mounted on the magnetic base, and a sensor sub-assembly provided with at least three magnetic sensors associated with the actuator bobbins. Moreover, at least one sub-assembly amidst the actuator sub-assembly and the sensor sub-assembly comprises at least three sectors mounted together. Furthermore, each sector includes: at least one actuator bobbin when the sector belongs to the actuator sub-assembly, or at least one magnetic sensor when the sector belongs to the sensor sub-assembly.

Thanks to the invention, labor time and cost to manufacture the magnetic bearing are reduced. The magnetic bearing has a modular construction, which makes its manufacturing process simpler and faster. Since at least one of the sub-assemblies comprises several sectors, the mounting of the magnetic system is easier and can be automatized. In comparison with manual assembly, automatic assembly reduces the labor time to manufacture the magnetic bearing and increases the feasibility of high production volumes. In comparison with a single laminations stack, the bobbins can be larger, thus increasing the load capacity of the magnetic bearing.

According to further aspects of the invention which are advantageous but not compulsory, such a magnetic bearing may incorporate one or several of the following features:

- The actuator sub-assembly comprises at least three sectors mounted together, each sector comprising at least one actuator horn and an actuator bobbin mounted on the actuator horn.
- The actuator sub-assembly comprises four sectors mounted together, each sector extending over an angle of 90 degrees around a central axis of the magnetic bearing.
- Each sector of the actuator sub-assembly comprises two actuator horns made together of a single part and two actuator bobbins mounted on the actuator horns.
- Each magnetic sensor is positioned at a junction between two sectors of the actuator sub-assembly.
- Each magnetic sensor is interposed between a central axis of the magnetic bearing and a center of one of the sectors of the actuator sub-assembly.
- The sensor sub-assembly comprises at least three sectors mounted together and each comprising at least one magnetic sensor.
- The sensor sub-assembly comprises a base and an intermediate support which is provided with sensor horns and is fastened between the base and each magnetic sensor received on one of the sensor horns.
- The intermediate magnetic support comprises a main portion and two sensor horns forming a fork.
- The magnetic bearing comprises two sensor sub-assemblies arranged on either side of the actuator sub-assembly.
- The magnetic bearing comprises only one sensor sub-assembly arranged on one side of the actuator sub-assembly.
- At least one magnetic system amidst the magnetic actuators and the magnetic sensors comprises together: a coil holder; a coil wound up around the coil holder; and a connector device integrated to the coil holder and designed for plugging at least one wire.
- The coil holder supports a single coil. In particular, the coil holder of the actuator bobbin supports a single coil.
- The coil holder comprises two parallel plates and a central part, the coil being wound up around the central part between the two parallel plates.
- The coil holder comprises two lateral portions, each supporting one coil. In particular, the coil holder of the magnetic sensor supports two coils.
- Each lateral portion of the coil holder comprises two parallel plates and a central part, the coil being wound up around the central part between the two parallel plates.

The coil holder of the actuator bobbin includes a recess which extends inside the coil and receives an actuator horn.

The coil holder of the magnetic sensor includes a recess which extends inside the coil and receives a sensor horn.

The connector device is an insulator displacement connector designed for receiving and automatically restraining at least one wire.

The invention also concerns a rotary apparatus, for example a flywheel, a turbo molecular pump, a turbo expander, a turbo compressor, an air blower, a spindle or a chiller, comprising a magnetic bearing as mentioned here-above.

The invention also concerns a method for manufacturing a magnetic bearing as mentioned here-above. The manufacturing method comprises at least the following steps:
a) manufacturing the actuator sub-assembly;
b) manufacturing the sensor sub-assembly; and
c) assembling the actuator sub-assembly and the sensor sub-assembly to form the magnetic bearing.

According to the invention, during step a) and/or during step b), at least three sectors are provided to form the actuator sub-assembly or the sensor sub-assembly, each sector including at least one magnetic actuator when the sector belongs to the actuator sub-assembly, or at least one magnetic sensor when the sector belongs to the sensor sub-assembly.

BRIEF DESCRIPTION OF THE DRAWINGS

The invention will now be explained in correspondence with the annexed figures, and as an illustrative example, without restricting the object of the invention. In the annexed figures.

DETAILED DESCRIPTION OF SOME EMBODIMENTS

Figure 1:
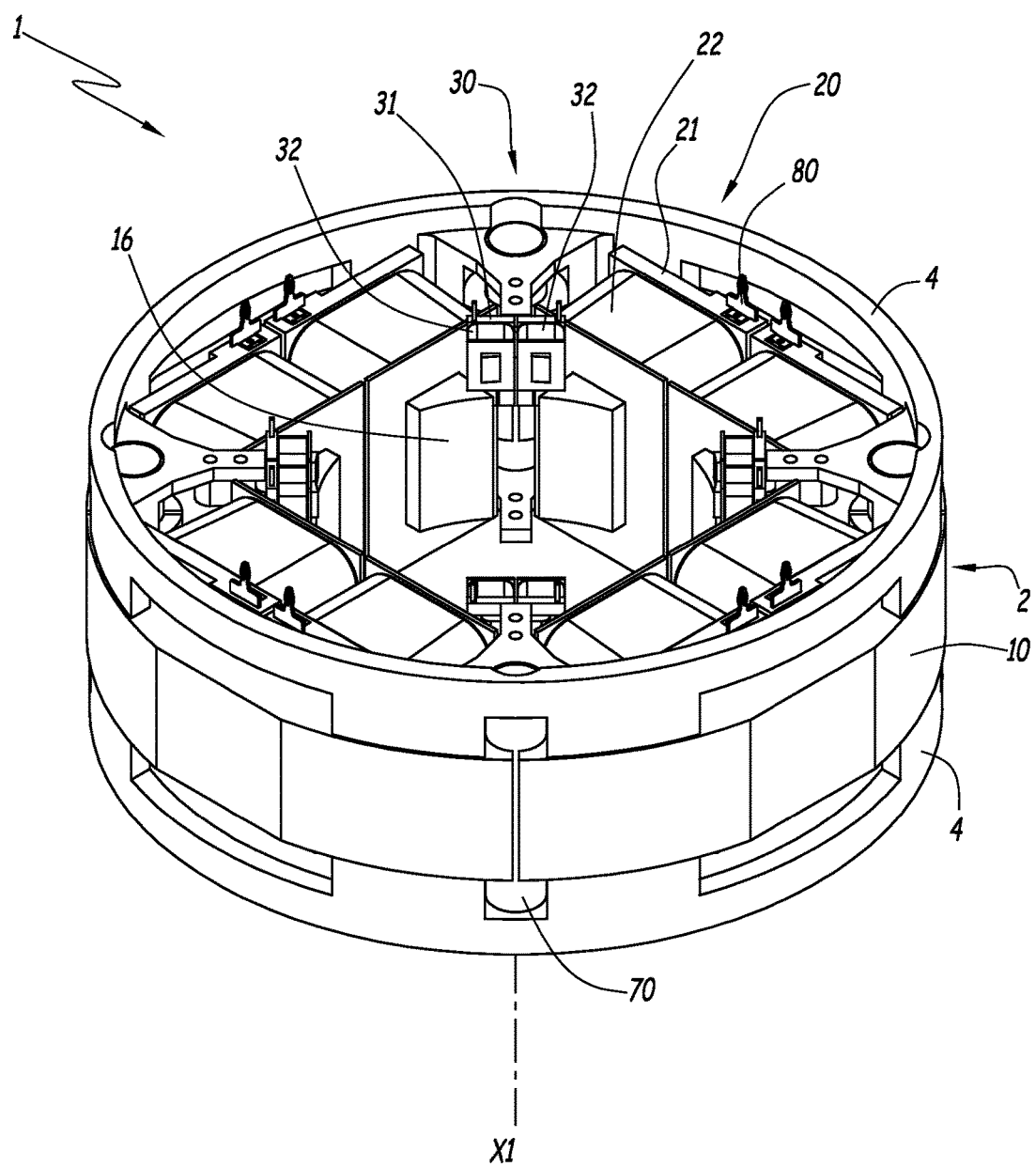
FIG. 1 is a perspective view of a radial magnetic bearing according to the invention.
Figure 2:
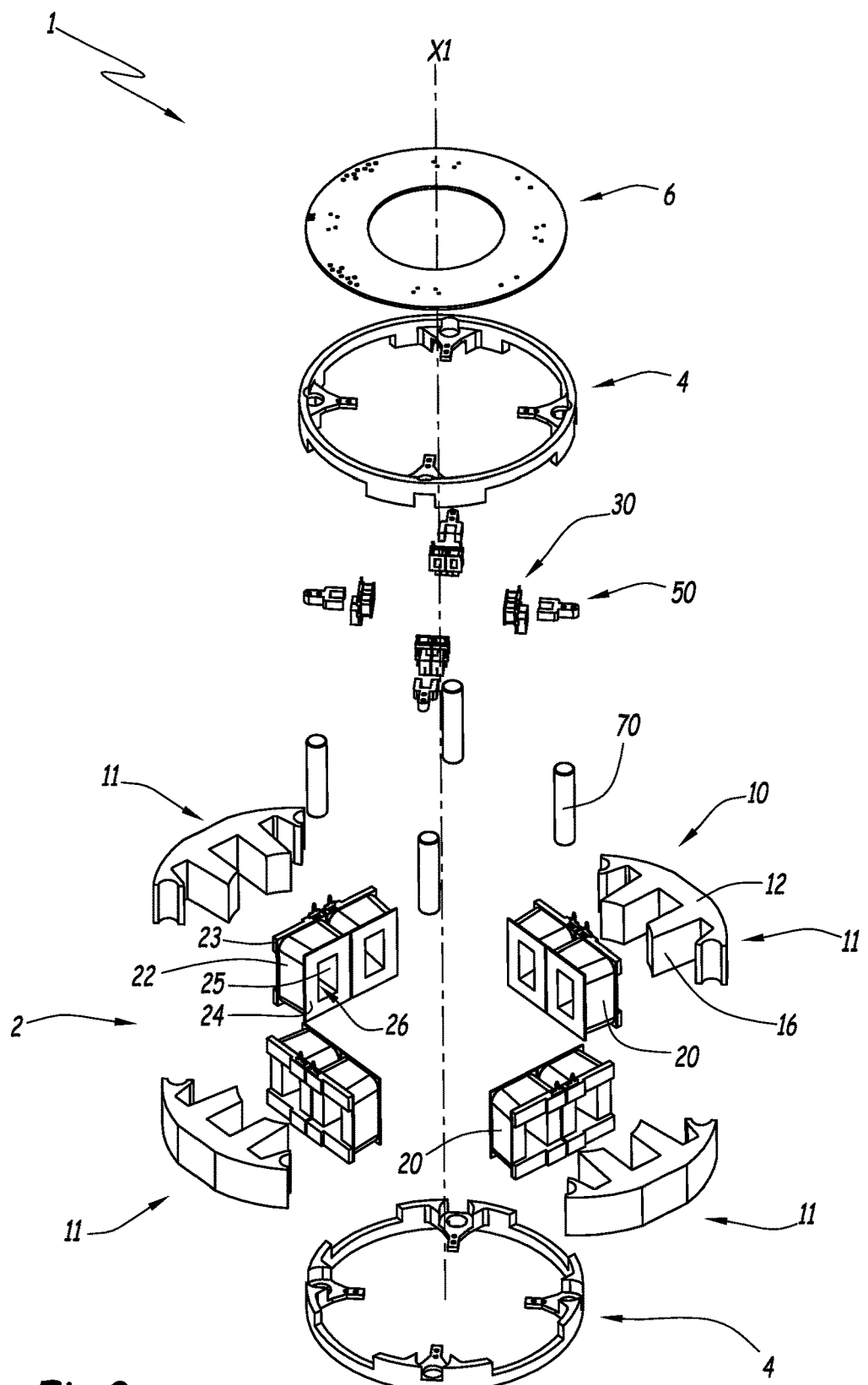
FIG. 2 is an exploded perspective view of the magnetic bearing of FIG. 1, comprising an actuator sub-assembly, two sensor sub-assemblies (with sensors represented for only one of them) and a printed circuit board.
Figure 3:
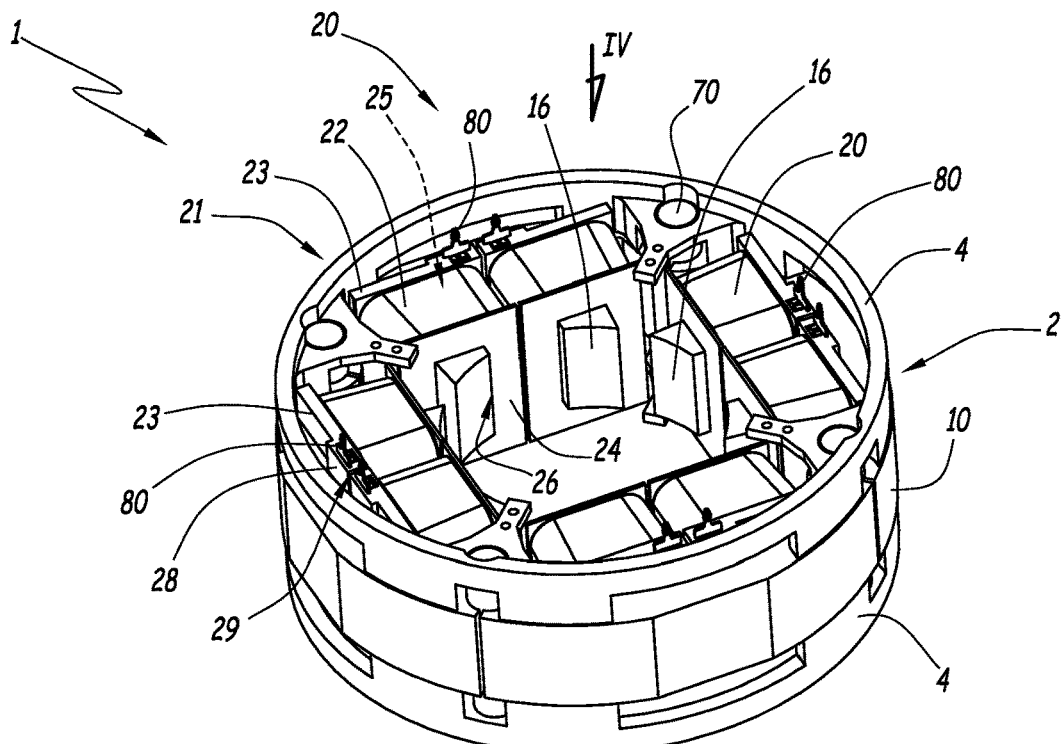
FIG. 3 is a perspective view at a larger scale of the assembled magnetic bearing, without the sensors and the printed circuit board.
Figure 4:
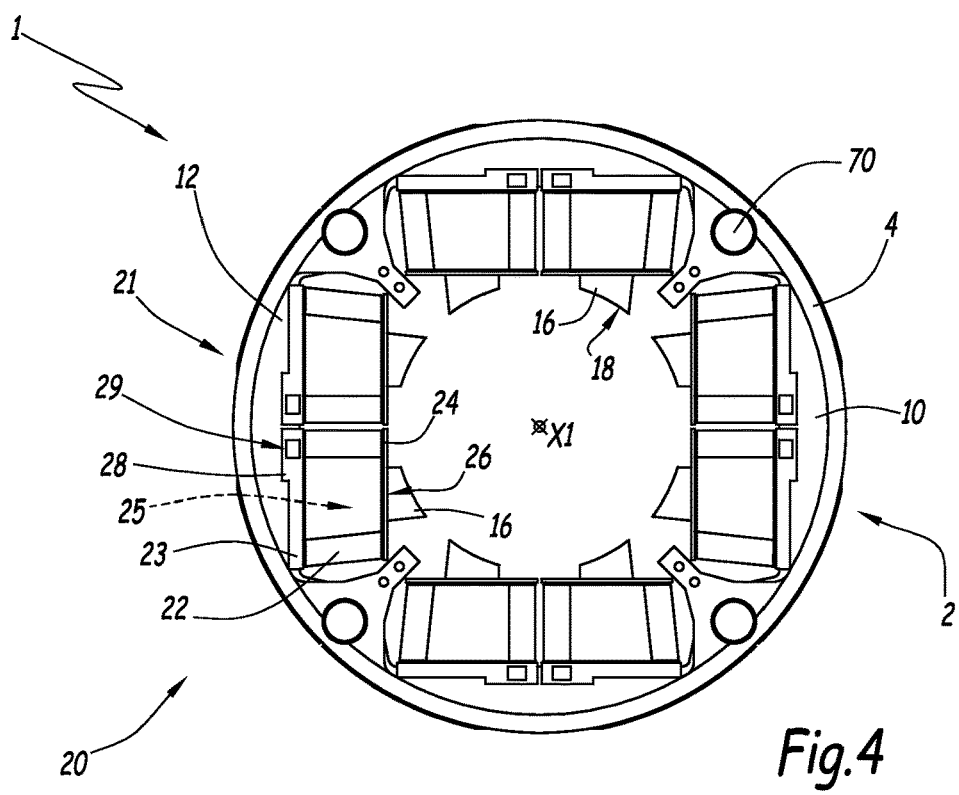
FIG. 4 is a top view along arrow IV of the magnetic bearing of FIG. 3.
Figure 5:
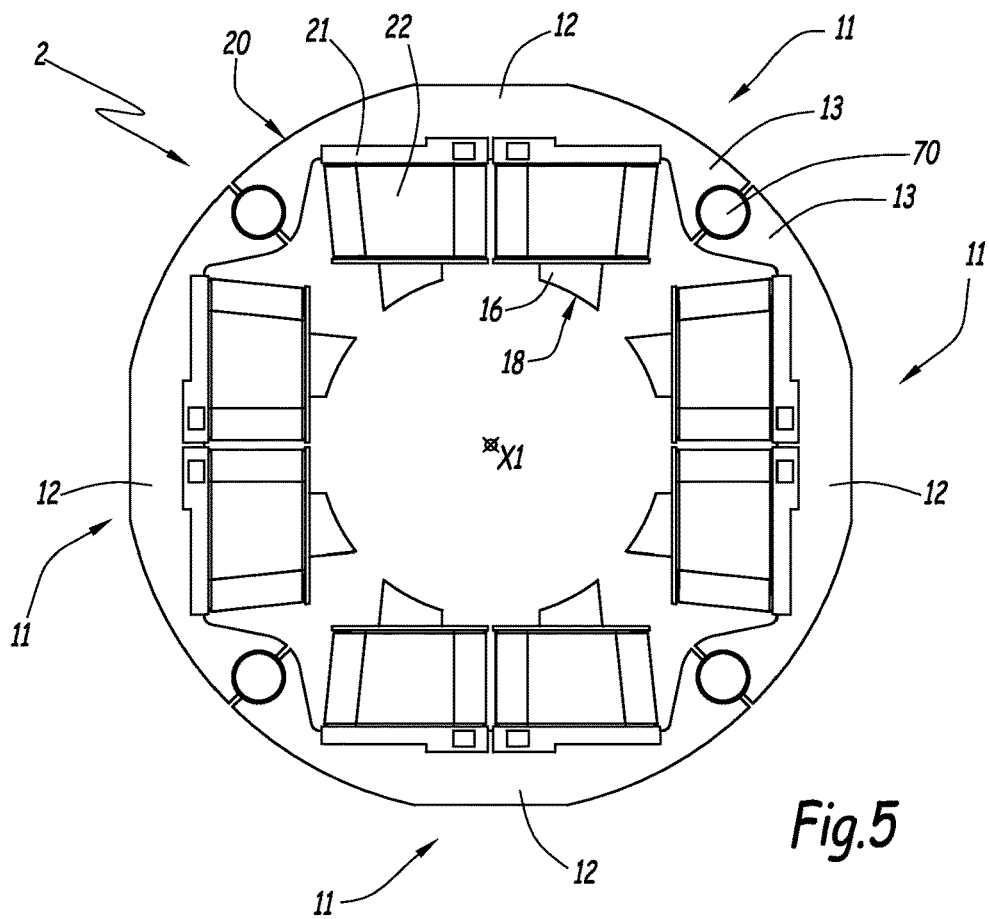
FIG. 5 is a view similar to FIG. 4, at a larger scale, showing the actuator sub-assembly comprising four sectors provided with magnetic actuator bobbins.
Figure 6:
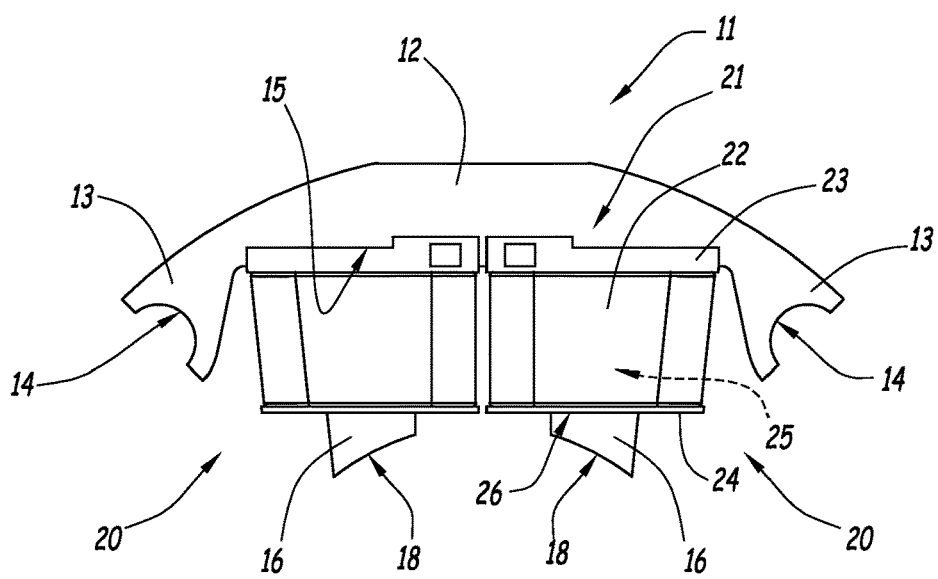
FIG. 6 is a view similar to FIG. 5, at a larger scale, showing only one sector of the actuator sub-assembly.

FIGS. 1 to 10 show a magnetic bearing 1 according to the invention and its constitutive elements. More precisely, FIGS. 1 to 10 show the static portion of a radial active magnetic bearing 1, while the rotor portion is not shown for simplification purpose.

As shown on FIGS. 1 to 4, the magnetic bearing 1 is centered on a central axis X1 and comprises an actuator sub-assembly 2, two sensor sub-assemblies 4 and a printed circuit board 6. The magnetic bearing 1 also comprises cover parts, not represented for simplification purpose, designed for housing elements 2, 4 and 6. The magnetic bearing 1 also comprises electrical wires, not represented for simplification purpose, for transmitting energy or signals. The magnetic bearing 1 has a modular construction, which makes its manufacturing process simpler and faster. The sub-assemblies 2 or 3 are configured to form magnetic circuits within magnetic bearing 1.

The actuator sub-assembly 2 comprises a magnetic actuator base 10, provided with radially inwardly protruding actuator horns 16. The actuator sub-assembly 2 also comprises actuator bobbins 20 mounted on the actuator horns 16. The actuator sub-assembly 2 comprises one actuator bobbin 20 per actuator horn 16. Each sensor sub-assembly 4 comprises magnetic sensor bobbins 30 and their magnetic supports 50 provided with radially inwardly protruding sensor horns 56. The sensor sub-assemblies 4 comprise one sensor horn 56 per sensor bobbin 30. Only the upper sub-assembly 4 is represented with sensors bobbins 30 and supports 50 on FIGS. 1 and 2, while sensor bobbins 30 and supports 50 are not represented on FIGS. 3 and 4, for simplification purpose.

As shown on FIGS. 1 to 6, the magnetic actuator base 10 comprises four sectors 11 distributed around axis X1. Each sector 11 extends over an angle of 90 degrees around axis X1. Each sector 11 is provided with two actuator horns 16 and two actuator bobbins 20 mounted on horns 16. Each sector 11 comprises a curved part 12 having an overall cylindrical shape centered on axis X1. Horns 16 are formed together, integral with part 12 by stacking laminations, manufactured preferably by stamping. Part 12 extends between two lateral extremities 13, each having a fork shape delimiting a half bore 14. Neighboring parts 12 are joined together by inserting a pin 70 in the half bores 14. Part 12 comprises a lodgment 15 oriented toward axis X1, around horns 16, for receiving actuator bobbins 20. Two horns 16 extend from part 12 in each lodgment 15 toward axis X1. In other words, base 10 comprises eight horns 16 distributed along ring 12 and around axis X1. Each horn 16 has a curved inner surface 18 facing axis X1. Together, surfaces 18 are located on a cylinder centered on axis X1 and delimit a space for receiving the rotor portion of the magnetic bearing 1. Each part 12 is preferably made of laminated metal stacks forming a unique block of magnetic material. Laminations of parts 12 can be stamped to form extremities 13, lodgments 15, horns 16 and surfaces 18. Thus, horns 16 are formed integral with parts 12.

Each actuator bobbin 20 comprises a coil holder 21 and a magnetic coil 22 wound up around holder 21. Coil Holder 21 is made of insulating plastic material, preferably polyamide plastic reinforced with 30% glass fibers (PA66 GF30). Coil 22 is made of a single metal wire, preferably of enameled copper.

Holder 21 comprises two parallel plates 23 and 24 connected by a hollow central part 25. Coil 22 is wound up around part 25 between plates 23 and 24. Holder 21 includes a recess 26 which is formed inside part 25 and is open in the middle of each plate 23 and 24. In other words, recess 26 extends through holder 21 and inside coil 22. Recess 26 is designed to receive a horn 16. In the present case, horn 16 and part 25 have rectangular transverse sections. Holder 21 also comprises a connection portion 28 including a slot 29 designed to receive a connector 80, as detailed here-below.

In practice, when an electric current is passed through coil 22, the associated horn 16 is magnetized, thus generating magnetic flux variations, which result in tension variations in coil 22 arranged around holder 21. Magnetic bearing 1 comprises four pairs of horns 16 and four pairs of coils 22 which, in operation form four magnetic circuits.

Figure 7:
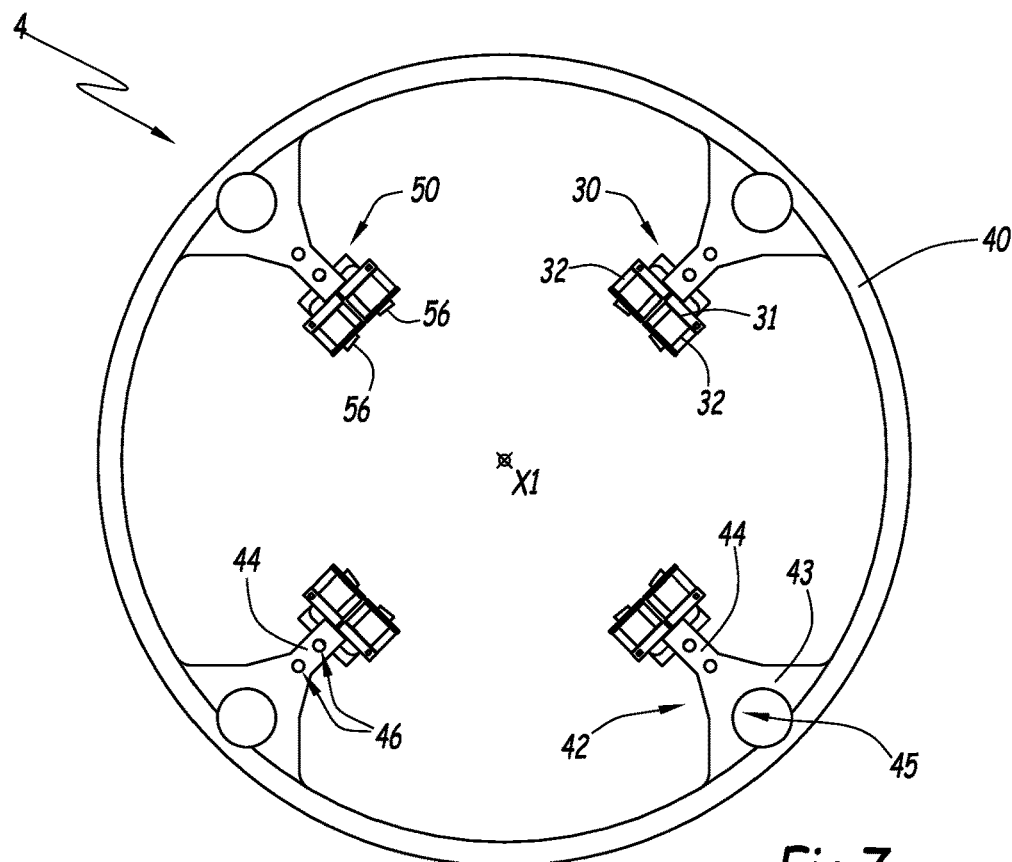
FIG. 7 is a view similar to FIG. 4, at a larger scale, showing the sensor sub-assembly comprising a base, intermediate magnetic supports and magnetic sensor bobbins.
Figure 8:
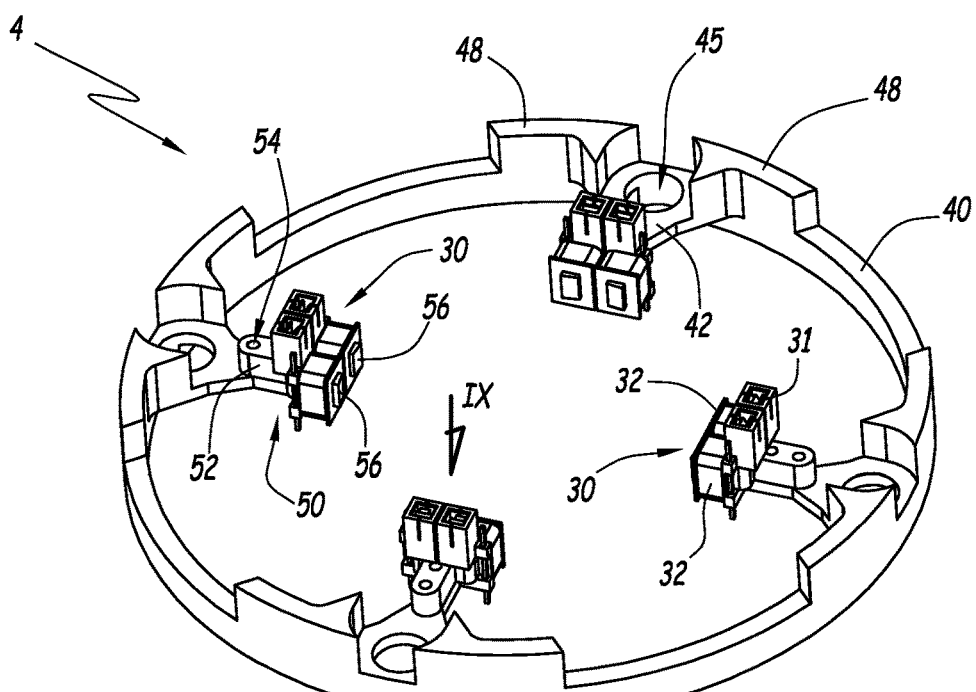
FIG. 8 is a perspective view of the sensor sub-assembly of FIG. 7.
Figure 9:
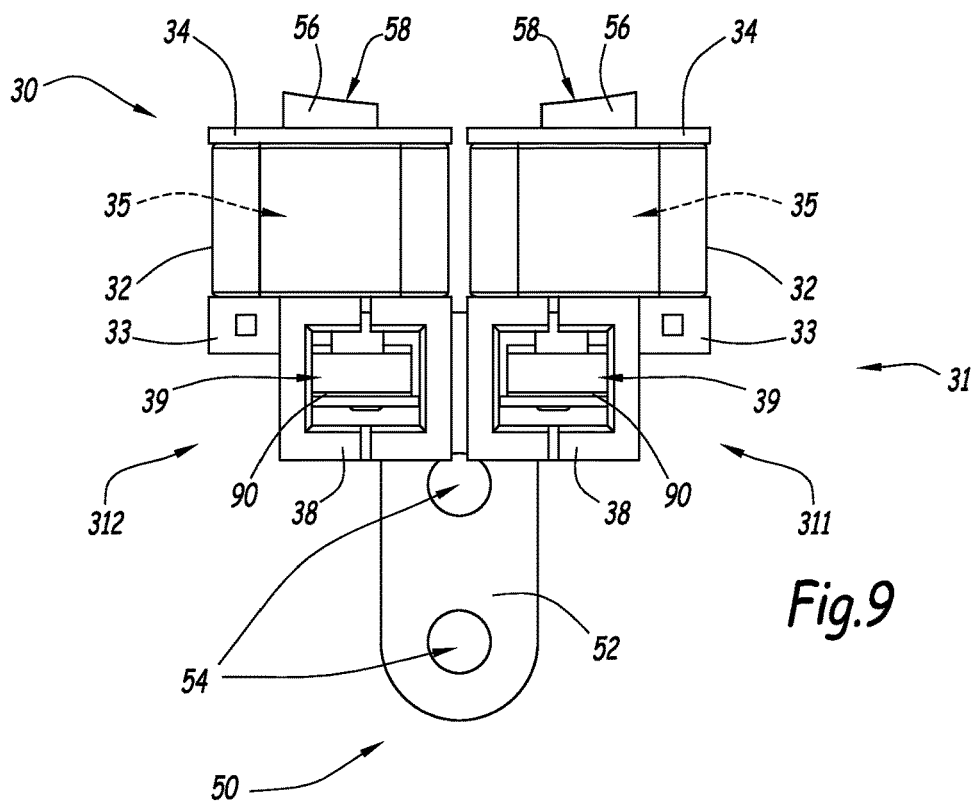
FIG. 9 is a top view along arrow IX on FIG. 8 of a magnetic sensor bobbin and its magnetic support.
Figure 10:
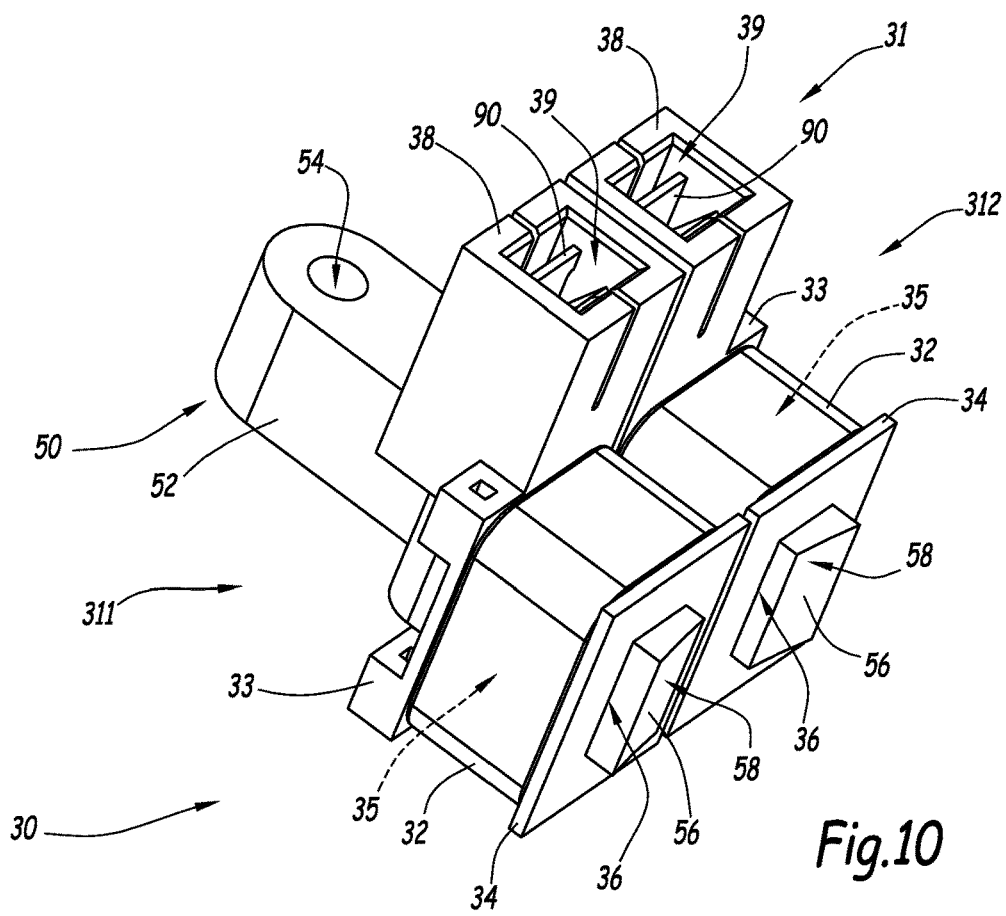
FIG. 10 is a perspective view of the magnetic sensor bobbin and its magnetic support shown on FIG. 9.

As shown on FIGS. 7 and 8, sensor sub-assembly 4 comprises an annular base or ring 40 centered on axis X1. Preferably, ring 40 is made of aluminum alloy. Four radial protrusions 42 extend from inside ring 40 toward axis X1 for receiving sensor bobbins 30. Each protrusion 42 comprises a large portion 43 connected to ring 40 and a thin portion 44 oriented toward axis X1. Four bores 45 parallel to axis X1 are formed at the junction of ring 40 and portions 43 for receiving pin 70. Two smaller bores 46 parallel to axis X1 are formed in each portion 44 for receiving fastening screws and mounting supports 50 on protrusions 42. Eight axial protrusions 48 extend under ring 40 for positioning sub-assembly 4 relative to sub-assembly 2, in addition to pin 70 forming angular indexing means. Protrusions 48 receive the top or bottom of base 10 in contact when the magnetic bearing 1 is assembled.

As shown on FIGS. 7 to 10, each sensor bobbin 30 comprises a coil holder 31 and two magnetic coils 32 wound up around holder 31. Holder 31 is made of plastic material, preferably polyamide plastic reinforced with 30% glass fibers reinforced (PA66 GF30). Coils 32 are made together of a single metal wire, preferably of enameled copper.

Holder 31 comprises two lateral portions 311 and 312, each comprising two parallel plates 33 and 34 connected by a hollow central part 35. Each coil 32 is wound up around part 35 between plates 33 and 34. Each portion 311 and 312 includes a recess 36 which is formed inside part 35 and is open in the middle of each plate 33 and 34. In other words, recess 36 extends through holder 31 and inside coil 32. Recess 36 is designed to receive a sensor horn 56 belonging to the magnetic support 50. Each portion 311 and 312 also comprises a connection portion 38 including a slot 39 designed to receive a connector 90, as detailed here-below. The copper wire forming coils 32 has both ends plugged into two connectors 90, one integrated to portion 311 and one integrated to portion 312.

In practice, each horn 56 is magnetized by the rotation of the rotor, thus generating magnetic flux variations, which result in tension variations in coil 32 arranged around holder 31. Magnetic bearing 1 comprises four pairs of horns 56 and four pairs of coils 32 which, in operation form four magnetic circuits.

Sensors formed by sensor bobbins 30 and horns 56 are designed to control the operation of actuators formed by actuator bobbins 20 and horns 16. Sensor bobbins 30 are linked to a control unit, not represented for simplification purpose. When the magnetic bearing 1 is mounted, each sensor bobbin 30 is positioned at a junction between two sectors 11 of the actuator sub-assembly 2. Thus, each sensor coil 32 is positioned next to an actuator coil 22. Horn 16 and 56, actuator coils 22 and sensor coils 32 are coupled by pairs, thus allowing radial position control of the rotor portion of the magnetic bearing 1.

Alternately, each sensor bobbin 30 can be interposed between axis X1 and the center of one sector 11. Thus, each sensor coil 32 is substantially aligned with an actuator coil 22 along central axis X1.

Magnetic supports 50 are mounted between sensor bobbins 30 and base 40, more precisely between coil holders 31 and protrusions 42. Magnetic supports 50 are preferably made of stack of magnetic laminations, for example FeSi. Each magnetic support 50 comprises a main portion 52 and two horns 56 forming a fork. Portion 52 is provided with bores 54 for receiving fastening screws and mounting support 50 on protrusion 42. Horns 56 are provided with surfaces 58 opposite portion 52, so that when all supports 50 are mounted on ring 40, surfaces 58 are located on a cylinder centered on axis X1 and delimit a space for receiving the rotor portion of the magnetic bearing 1, similarly to surfaces 18 of horns 16. Horns 56 are designed to be inserted into recesses 36 provided in holders 31, so that sensor bobbins 30 can be mounted on supports 50, which are mounted on ring 40, to form the sensor sub-assembly 4.

Connectors 80 and 90 are preferably insulator displacement connectors, designed for receiving and automatically restraining wires, without welding operation. A first type of wire is an enameled wire designed to form coils 22 or 32 wound up around holder 21 or 31. A second type of wire is a sheathed wire designed to connect nearby actuator bobbin 20 or nearby sensor bobbins 30 with each other. Connectors 80 and 90 are integrated to holders 21 and 31 by fitting in slots 29 and 39 designed thereto. Alternately, coil holders 21 and 31 may integrate any connector devices adapted to the present application, other than connectors 80 and 90. Whatever the type of connector device, it is integrated to one of coil holders 21 or 31, thus allowing easier plugging of wires and connection of magnetic systems 20 or 30 with each other.

The invention also concerns a method for manufacturing the magnetic bearing 1.

The manufacturing method comprises at least the following steps a), b) and c). Step a) consists in manufacturing the actuator sub-assembly 2. Preferably in step a), coils 22 are automatically wound up around holders 21 in an automatic winding machine, then actuator bobbins 20 are mounted on horns 16. Step b) consists in manufacturing the sensor sub-assemblies 4. Preferably in step b), coils 32 are automatically wound up around holders 31 in an automatic winding machine, then sensor bobbins 30 are mounted on horns 56, then supports 50 are mounted on base 40. Step c) consists in assembling sub-assembly 2 and sub-assemblies 4 to form the magnetic bearing 1. Preferably in step c), sectors 11 of sub-assembly 2 are mounted together and secured between sub-assemblies 4, then printed circuit board 6 is mounted on sub-assemblies 2 and 4.

According to the embodiment of the invention represented on FIGS. 1 to 10, during step a), sectors 11 are provided to form sub-assembly 2. Since sub-assembly 2 comprises several sectors 11, the mounting of actuator bobbins 20 on horns 16 is easier and can me automatized. In comparison with manual assembly, automatic assembly reduces the labor time to manufacture the magnetic bearing and increases the feasibility of high production volumes.

Advantageously during steps a) and b), the wire constituting coil 22 or 32 can be automatically inserted in connector 80 or 90, then coil 22 or 32 can be automatically wound up around its coil holder 21 or 31 in a winding machine. In comparison with manual winding, automatic winding reduces the labor time to manufacture the magnetic bearing 1 and increases the feasibility of high production volumes. Moreover, automatic winding improves the repetitiveness of electrical and magnetic characteristics of actuator bobbins 20 and sensor bobbins 30.

Other non-shown embodiments can be implemented within the scope of the invention.

According to a non-shown embodiment, the magnetic bearing 1 may include a different number of horns 16 and 56, actuator coils 22 and sensor coils 32. Preferably, the magnetic bearing 1 includes pairs of horns 16 and 46, receiving pairs of coils 22 and 32. In other words, each actuator coil 22 is associated with a sensor coil 32.

According to another non-shown embodiment, actuator bobbins 20 may have a holder 21 including two portions for holding two coils 22, like holder 31 includes two portions 311 and 312 for holding two coils 32. In this case, the two actuator coils 22 are associated with two sensor coils 32.

According to another non-shown embodiment, sensor bobbins 30 may have a holder 31 supporting only one coil 32, like holder 21 supports only one coil 22. In this case, two sensor coils 32 belonging to two sensor bobbins 30 are associated with two actuator coils 22.

According to another non-shown embodiment, the magnetic sensors equipping the magnetic bearing 1 may have a configuration different from a sensor bobbin 30 as described above.

In the example of FIGS. 1 to 10, the actuator sub-assembly 2 comprises four sectors 11 mounted together, each sector 11 comprising two actuator bobbins 20, while the sensor sub-assembly 4 comprises a ring 40 but no sectors. In other words, actuator sub-assembly 2 is a sectored sub-assembly.

According to another non-shown embodiment, the sectored actuator sub-assembly 2 may comprise a different number of sectors 11 mounted together, with at least three sectors 11, each sector 11 comprising at least one actuator bobbin 20.

According to another non-shown embodiment, the sensor sub-assembly 4 may comprise at least three sectors forming ring 40, with each sector comprising at least one sensor bobbin 30. In other words, sensor sub-assembly 4 is a sectored sub-assembly.

In the example of FIGS. 1 to 10, the magnetic bearing 1 comprises two sensor sub-assemblies 4 arranged on either side of the actuator sub-assembly 2. The first one is needed for the radial position function, while the second one can be used for the detection of axial position of the rotor.

According to another non-shown embodiment, the magnetic bearing may comprise only one sensor sub-assembly arranged on one side of the actuator sub-assembly.

Whatever the embodiment of the invention, at least one sub-assembly 2 or 4 comprises at least three sectors mounted together, each sector including at least one magnetic system 20 or 30.

In addition, technical features of the different embodiments can be, in whole or part, combined with each other. Thus, the magnetic bearing 1 and its manufacturing method can be adapted to the specific requirements of the application.

What is claimed is:

1. A magnetic bearing, adapted to equip a rotary apparatus, the magnetic bearing comprising:
   an actuator sub-assembly provided with a magnetic base and at least three actuator bobbins mounted on the magnetic base, each actuator bobbin of the at least three actuator bobbins comprising a coil circumscribing a hollow central part, the hollow central part having a recess passing therethrough;
   the actuator sub-assembly comprises at least three sectors mounted together, each sector comprising at least one actuator horn, and
   a sensor sub-assembly provided with at least three magnetic sensors associated with the actuator bobbins,
   wherein each actuator bobbin of the at least three actuator bobbins is mounted on the magnetic base by passing the respective actuator horn through the respective recess of the hollow central part,
   wherein at least one sub-assembly amidst the actuator sub-assembly and the sensor sub-assembly comprises at least three sectors mounted together,
   wherein each sector includes one of:
      at least one actuator bobbin when the sector belongs to the actuator sub-assembly, or
      at least one magnetic sensor when the sector belongs to the sensor sub-assembly.

2. The magnetic bearing according to claim 1, wherein the actuator sub-assembly comprises four sectors mounted together,
   each sector extending over an angle of 90 degrees around a central axis of the magnetic bearing.

3. The magnetic bearing according to claim 1, wherein each sector of the actuator sub-assembly comprises two actuator horns made together of a single part and two actuator bobbins mounted on the actuator horns.

4. The magnetic bearing according to claim 1, wherein each magnetic sensor is positioned at a junction between two sectors of the actuator sub-assembly.

5. The magnetic bearing according to claim 1, the sensor sub-assembly further comprising at least three sectors mounted together and each comprising at least one magnetic sensor.

6. The magnetic bearing according to claim 1, the sensor sub-assembly further comprising a base and an intermediate magnetic support which is provided with sensor horns and is fastened between the base and each magnetic sensor received on one of the sensor horns.

7. The magnetic bearing according to claim 6, the intermediate support further comprising a main portion and two sensor horns forming a fork.

8. The magnetic bearing according to claim 1, further comprising two sensor sub-assemblies arranged on either side of the actuator sub-assembly.

9. The magnetic bearing according to claim 1, wherein at least one magnetic system amidst the actuator bobbins and the sensor bobbins comprises together:
   a coil holder;
   a coil wound up around the coil holder; and
   a connector device integrated to the coil holder and designed for plugging at least one wire.

10. The magnetic bearing according to claim 9, wherein the coil holder supports a single coil.

11. The magnetic bearing according to claim 9, the coil holder further comprising two lateral portions, each supporting one coil.

12. The magnetic bearing according to claim 9, wherein the connector device is an insulator displacement connector designed for receiving and automatically restraining at least one wire.

13. The magnetic bearing according to claim 1, wherein the magnetic bearing is integrated into a rotary apparatus.

14. The magnetic bearing according to claim 13, wherein the rotary apparatus is one of:
   a flywheel, a turbo molecular pump, a turbo expander, a turbo compressor, an air blower, a spindle or a chiller.

15. A method for manufacturing a magnetic bearing, the magnetic bearing comprising:
   an actuator sub-assembly provided with a magnetic base and at least three actuator bobbins mounted on the magnetic base, each actuator bobbin of the at least three actuator bobbins comprising a coil circumscribing a hollow central part, the hollow central part having a recess passing therethrough;

the actuator sub-assembly comprises at least three sectors mounted together, each sector comprising at least one actuator horn, and a sensor sub-assembly provided with at least three magnetic sensors associated with the actuator bobbins, wherein each actuator bobbin of the at least three actuator bobbins is mounted on the magnetic base by passing the respective actuator horn through the respective recess of the hollow central part, wherein at least one sub-assembly amidst the actuator sub-assembly and the sensor sub-assembly comprises at least three sectors mounted together, wherein each sector includes one of:
  at least one actuator bobbin when the sector belongs to the actuator sub-assembly, or
  at least one magnetic sensor when the sector belongs to the sensor sub-assembly, the method comprising steps of:
  a) manufacturing the actuator sub-assembly, including a step of sliding each actuator bobbin onto the magnetic base by passing the respective actuator horn through the respective recess of the hollow central part;
  b) manufacturing the sensor sub-assembly; and
  c) assembling the actuator sub-assembly and the sensor sub-assembly to form the magnetic bearing;

wherein at least one of during step a) and during step b),
  at least three sectors are provided to form the actuator sub-assembly or the sensor sub-assembly, each sector including one of:
    at least one magnetic actuator bobbin when the sector belongs to the actuator sub-assembly, or
    at least one magnetic sensor bobbin when the sector belongs to the sensor sub-assembly.

* * * * *